May 27, 1969 L. D. MODGLIN 3,446,516
TRAILER FOR AUTOMOTIVE VEHICLES AND THE LIKE
Filed Sept. 16, 1966 Sheet 1 of 2

INVENTOR
Leslie D. Modglin

INVENTOR
Leslie D. Modglin
United States Patent Office 3,446,516
Patented May 27, 1969

3,446,516
TRAILER FOR AUTOMOTIVE VEHICLES AND THE LIKE
Leslie D. Modglin, P.O. Box 16, Oneida, Ill. 61467
Filed Sept. 16, 1966, Ser. No. 579,907
Int. Cl. B62d 63/06
U.S. Cl. 280—415                    2 Claims

ABSTRACT OF THE DISCLOSURE

This trailer is made up of two trailers which are closely coupled together in end-to-end relation, with a portion of the last trailer projecting over a portion of the front trailer. The front trailer may be a boat trailer or an extra storage container.

---

This invention relates to trailers, and more particularly to trailers that are secured to the rear end of automotive vehicles and the like, and still more particularly to trailers that embody among other things, a house or its equivalent.

While there are any number of different kinds of trailers for automotive vehicles and the like, they all normally consist of a wheel supported frame having either a body of some form of house thereon or else means of supporting a boat or the like. None are known to embody both means of carrying a house and boat or some other object such as an extra storage container that is also supported by wheels.

It is therefore the principal object of this invention to provide a trailer for automotive vehicles and the like that will not only embody a second wheeled carrier, but also the aforementioned house or its equivalent.

Another object of this invention is to provide a trailer for automotive vehicles and the like that has the front end of the house portion of the trailer overlapping the rear end of the boat or other wheeled vehicle that is secured to the rear end of an automotive vehicle, thereby making the overall length of the entire trailer unit considerably less than two separate trailing units connected one behind the other would be.

Another object of this invention is to provide a trailer for automotive vehicles and the like that consist of two separate trailing units, one of which is a wheeled house L-shaped when viewed from the side, that can either be used in connection with a separate wheeled trailing unit or not according to one's desires and needs.

Another object of this invention is to provide a trailer for automotive vehicles and the like that can be provided with any desired style of body on either or both of its two-wheeled units.

Another object of this invention is to provide a trailer for automotive vehicles and the like having two-wheeled body supporting units so connected together as to provide a single four-wheel trailer that is secured to the rear end of an automotive vehicle in the normal manner known to those experienced in the art.

Still another object of this invention is to provide a trailer for automotive vehicles and the like that can be manufactured by anyone already in the trailer manufacturing business without the necessity of adding new machinery or tools to the plant.

Other and further objects and advantages of this invention will become apparent as the reading of this specification continues and the appended drawings are examined.

Figure 1:
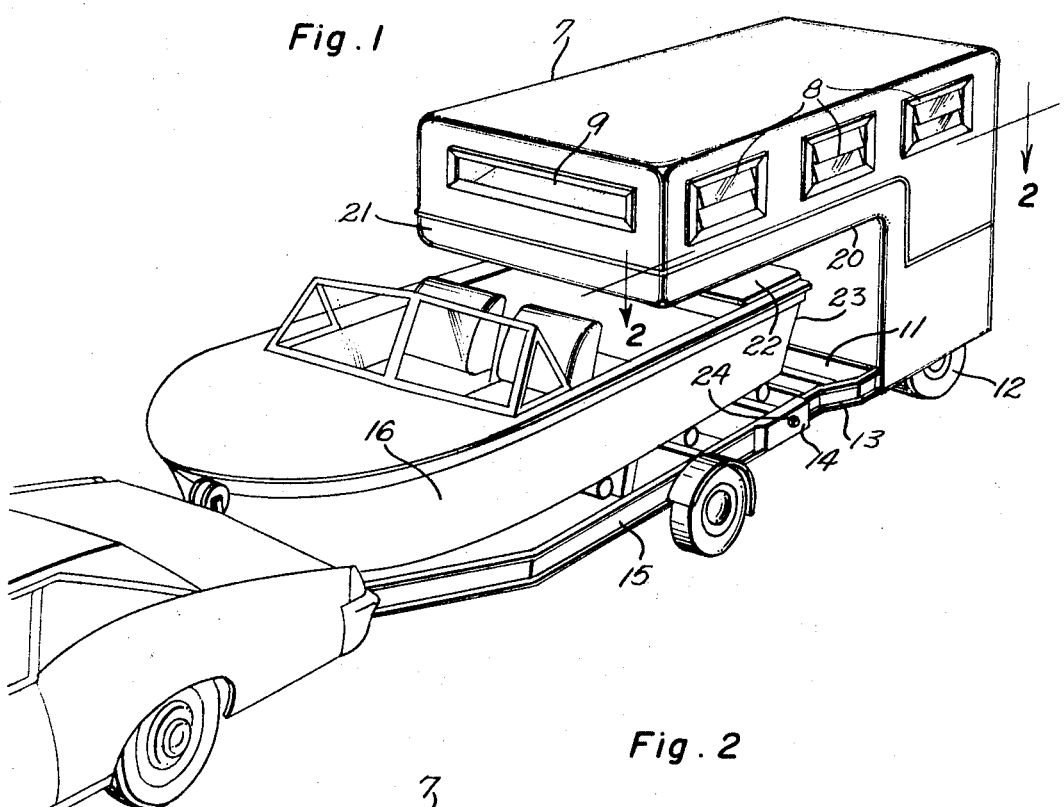
FIG. 1 is a perspective view of this invention secured to the rear end of an automobile.
Figure 2:
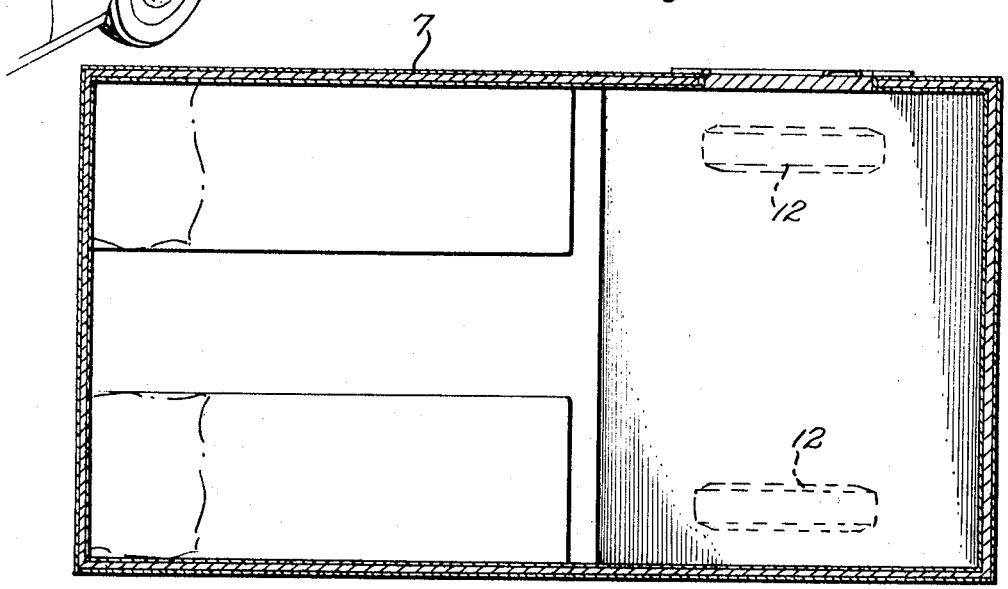
FIG. 2 is a sectional view taken substantially along line 2—2 of FIGURE 1 and viewed in the direction indicated by the arrows.
Figure 3:
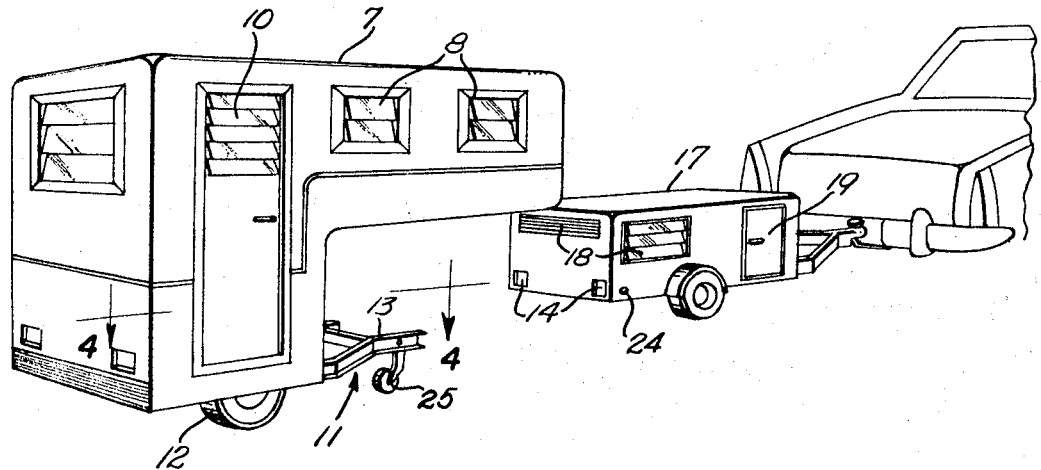
FIG. 3 is a perspective view of an optional form of this invention as seen from the right rear side. The invention is secured to the rear end of an automobile.
Figure 4:
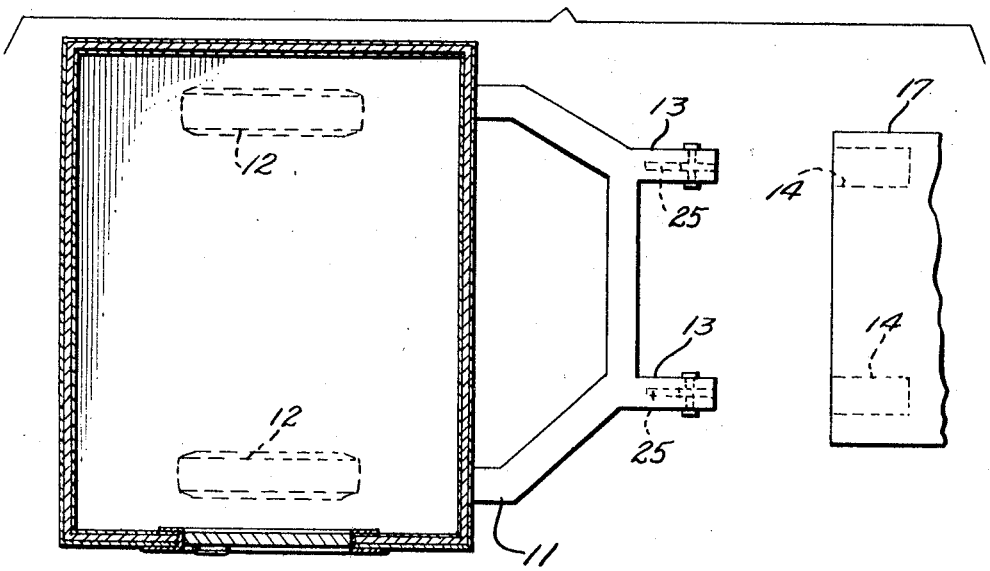
FIG. 4 is a sectional view of this invention taken substantially along line 4—4 of FIGURE 3 and viewed in the direction indicated by the arrows.

In the accompanying drawings like parts of the invention are indicated by like reference characters throughout the several views of the trailer. The reference character 7 indicates a house trailer that has a side configuration of an inverted capital letter L. The aforesaid house trailer having any desired interior arrangement normally embodies a plurality of side windows 8 therein as well as an elongated front window 9 and a door 10 that is also located in the side of the trailer whose body is suitably secured to a supporting frame 11 that is mounted on a pair of wheels 12. The aforesaid frame 11 embodies a pair of forwardly extending horizontally disposed members 13, there being one member on each side of the trailer. The aforesaid members 13 are designed to be slipped into the sockets 14 of the wheeled trailer 15 that in turn in suitably and removably secured to the rear end of any automotive vehicle or the like by any desired means. In looking at the accompanying drawings it will be seen that the wheel trailer 15 may be designed to support a boat 16 as one can see by examining FIGURE 1 of the drawings, or the trailer may be built in the form of a wheeled container that is illustrated in FIGURES 3 and 4 of the drawings, and indicated by the reference character 17.

When the trailer 17 is in the form of the mentioned wheeled container, the trailer may be provided with side and back ventilators 18 and a small door 19 as this trailer is always to be made of such height as to fit under the underside 20 of the front portion 21 of the house trailer 7. Should the trailer 15 be made to support the boat 16 or the like, then the trailer should be of such height as to permit the deck 22 of the stern 23 of the boat to fit under the front end of the house trailer 7.

It should be understood that there is to be no limitation placed on the construction or either the house trailer 7 or the trailer 15. Either or both trailers may be made of any desired materials and/or combination(s) of materials. The second trailer 15 may be of any desired configuration. One way of securing the aforesaid trailer 7 to trailer 15 or 17, is by a laterally disposed headed pin 24 that is inserted in proper and mating openings in the aforesaid sockets 14 and end(s) of the already mentioned members 13 of the frame 11 of the house trailer 7 of this invention. While the frame 11 of house trailer 7 has been stated to embody a pair of wheels 12, a set of auxiliary wheels 25 are also normally mounted under the front end of the frame as one can clearly see by examining FIGURES 3 and 4 of the accompanying drawings.

Having now described my invention, what I claim is:

1. A trailer for automotive vehicles and the like comprising a pair of trailers removably connected one to another and end to end, one of said trailers adapted to be connected to the rear end of an automotive vehicle, and the other one of the two said trailers having a body that has the side configuration of an inverted capital letter L, being adapted to have its front end extend over the rear end of the first mentioned trailer, the second mentioned trailer having two members of its frame at each side thereof extending forward from the front of its rear portion under said front end, said first mentioned trailer having a socket on each side of the rear end thereof, the sockets being adapted to receive the said frame members and means to secure said frame members in said sockets.

2. The invention of claim 1 wherein that one of the said trailers that is to be connected directly to the rear end of the said automobile is in the form of a storage trailer and the last trailer extends over substantially the entire storage trailer.

References Cited

UNITED STATES PATENTS

| | | | |
|---|---|---|---|
| 3,143,121 | 8/1964 | McKee | 296—23 |
| 3,339,942 | 9/1967 | Ratkovich | 280—423 |
| 3,348,859 | 10/1967 | Melbye | 280—414 X |

FOREIGN PATENTS

| | | |
|---|---|---|
| 1,250,559 | 12/1960 | France. |
| 811,601 | 4/1959 | Great Britain. |
| 963,781 | 7/1964 | Great Britain. |

LEO FRIAGLIA, *Primary Examiner.*
JOHN A. PEKAR, *Assistant Examiner.*

U.S. Cl. X.R.

214—515; 296—28